United States Patent [19]

Montrella

[11] E Re. 28,855

[45] Reissued June 15, 1976

[54] SWIM TRAINING PADDLE

[76] Inventor: Anthony James Montrella, P.O. Box K, Lakewood, Calif. 90714

[22] Filed: Aug. 26, 1974

[21] Appl. No.: 500,724

Related U.S. Patent Documents

Reissue of:

[64] Patent No.: 3,765,042
Issued: Oct. 16, 1973
Appl. No.: 283,321
Filed: Aug. 24, 1972

[52] U.S. Cl. ..... 9/307
[51] Int. Cl.[2] ..... A63B 31/02
[58] Field of Search ..... 9/307, 308

[56] References Cited

UNITED STATES PATENTS

| | | | |
|---|---|---|---|
| 675,695 | 6/1901 | Whitcomb | 9/307 |
| 2,555,969 | 6/1951 | Holcombe | 9/307 |
| 2,810,138 | 10/1957 | Cochran | 9/307 |
| 3,397,414 | 8/1968 | Webb | 9/307 |
| 3,698,026 | 10/1972 | Buntin | 9/308 |

*Primary Examiner*—Trygve M. Blix
*Assistant Examiner*—Gregory W. O'Connor
*Attorney, Agent, or Firm*—Jack C. Munro

[57] ABSTRACT

A paddle to assist in the training of swimmers wherein the base of the paddle is formed of rigid sheet material in a substantially rectangular configuration, the aft edge of the paddle being relieved to unhinder the pivoting of the swimmer's hand about the wrist, the hand of the swimmer being fixedly located upon the paddle by a wrist band and a center finger band.

6 Claims, 4 Drawing Figures

SWIM TRAINING PADDLE

Matter enclosed in heavy brackets [ ] appears in the original patent but forms no part of this reissue specification; matter printed in italics indicates the additions made by reissue.

BACKGROUND OF THE INVENTION

It is well known that there is a point of maximum efficiency of hand movement through water for a swimmer. This maximum efficiency depends upon the speed, angle and pitch of the hand as it moves through the water. Actually it has been discovered that the maximum efficiency depends upon variation of the speed, angle and pitch as the hand moves through the water. This variation requires that the hand oscillate to different positions as it moves through the water. It has been discovered that a paddle assists the swimmer to be able to perceive this variation.

The use of swimming paddles in itself is old. However, the swimming paddles of the prior art are known to have certain disadvantages. It is common for previous paddles to place a strap entirely about the fingers of a swimmer. The paddle of the present invention, as will become apparent further on, uses a band or strap about a single finger which creates a narrow fulcrum. A broad fulcrum is basically insensitive in comparison to a narrow fulcrum. It is agreed that the manipulation of a paddle is harder to control with a narrower fulcrum. But the narrower fulcrum accentuates the swimmer's sensitivity to the position of the hand at the most efficient position.

Another common problem of paddles of the prior art is that they restrict movement of the wrist. The aft end of the paddles of the prior art tend to bite into the joint adjacent the wrist which restricts the joint movement and bites into the skin. The paddle of this invention has overcome this difficulty by being relieved at the aft end of the paddle, thereby eliminating the possibility of the paddle biting into the wrist.

Another problem of paddles of the prior art is that they encounter difficulty in recovery at the end of the stroke. In other words, if the water force acts against the forward propulsive movement of the swimmer at the end of the pull phase of the stroke, this tends to slow the swimmer and decrease the swimming speed. This resistance in recovery is normally caused by the water being conducted between the hand and the paddle.

The paddle of this invention holds the swimmer's hand firmly to the paddle at all times and does not permit water to enter between the paddle and the hand. Therefore, the resistance to the recovery movement and forward progress is minimized.

Previous paddles have normally been constructed of a material which does not float. With a swimmer swimming in dark areas, in dark murky water or ocean water and the paddle is lost, it is not uncommon for the paddle to never be found. Also, if the paddle was located at the bottom of a deep pool, it may be unsafe to retrieve the paddle.

In an effort to avoid this, the paddle of this invention is constructed of polyethylene plastic which floats and can be readily colored to assist in finding a lost paddle. Frequently, the paddles of the prior art were constructed of a material which could not be colored other than painted which inevitably became chipped.

Another main disadvantage of the paddles of the prior art is that the paddles did not incorporate any relieved area which caused such to cut the wrist. It has been discovered that the inherent repetitive movement of the swimmer during use may cause an unrelieved paddle to cut the skin and blood vessels of the wrist. Also the sharp edges of previous paddles frequently cut clothing, including swimming suits. The paddle of this invention has no sharp edges which can cause damage or injury.

It is common for the previous paddles to be constructed in only one size. This size paddle may not be the optimum size paddle for a particular size hand of an individual and that person cannot achieve maximum efficiency of movement through the water. The paddle of this invention can be readily constructed in numerous sizes so that a particular swimmer can select the particular size of paddle which is most suited to his sized person.

Another disadvantage of the paddles of the prior art is that the bands which retain the hand of the paddle are normally integrated with the paddle. Therefore, if the band broke, the entire paddle would be discarded. An advantage of the apparatus of this invention is that the bands of this invention are a readily commercially available item and if they break can be readily replaced. Therefore it is not required to discard the paddle.

DETAILED DESCRIPTION OF THE SHOWN EMBODIMENT

Figure 1:
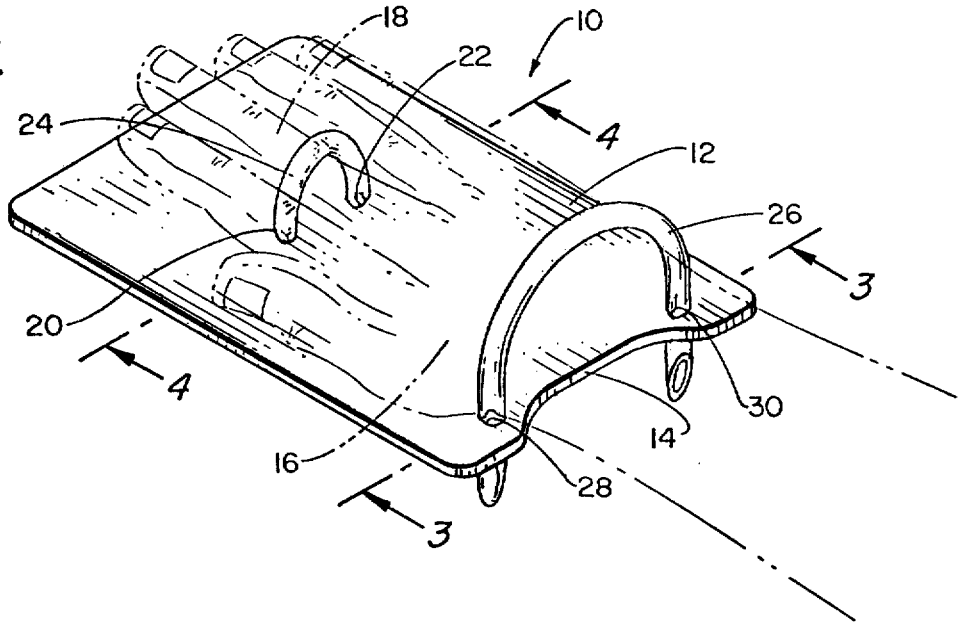
FIG. 1 is an isometric view of the paddle of this invention showing how such could be used by a swimmer.
Figure 2:
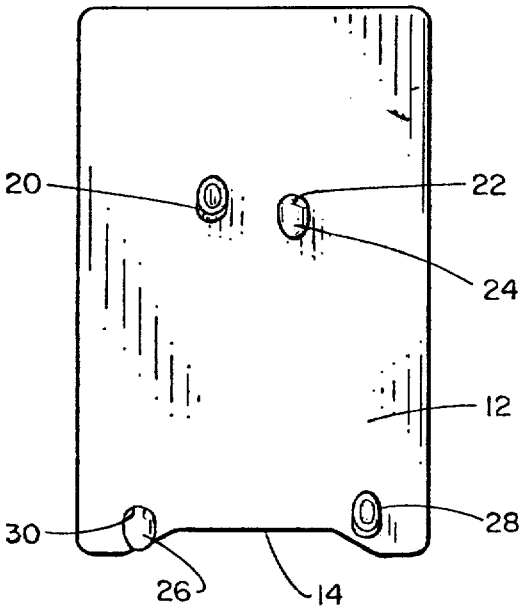
FIG. 2 is a bottom view of the paddle of this invention.

Referring particularly to the drawings, there is generally shown in FIG. 1 the paddle 10 of this invention being composed of a sheet material base 12 with the aft end of the base 12 having a relieved area 14. The base 12 is to be manufactured from polyethylene plastic so as to float upon water. The swimmer is to insert his hand 16 against the base 12 as is shown in FIG. 1. The relieved area 14 is located directly adjacent the wrist of the swimmer and is to substantially unhinder the pivoting of the hand with respect to the wrist.

Located within the base 12 is a first pair of openings 28 and 30 located adjacent the aft end of the base 12. Also located in the base 12 is a second pair of openings 20 and 22 located intermediate the ends of the base 12 but nearer the fore end of the base 12. Bands 24 and 26 are to be employed which will normally take the form of lengths of flexible rubber tubing. This tubing is to be soft readily flexible rubber and can be easily stretched. A common form of such tubing is frequently termed surgical tubing.

Figure 3:
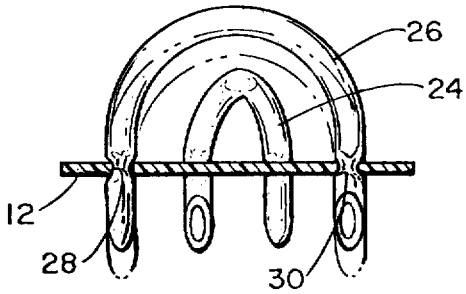
FIG. 3 is a cross-sectional view through the paddle of this invention taken along line 3—3 of FIG. 1.
Figure 4:
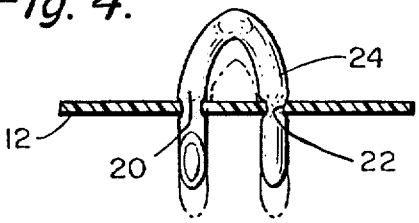
FIG. 4 is a cross-sectional view through the paddle of this invention taken along line 4—4 of FIG. 1.

Each end of the band 24 is to be stretched and inserted through the openings 20 and 22 such as is shown in FIG. 4 of the drawings. Also in a similar manner the ends of the tubing 26 are to be stretched through openings 28 and 30. The amount of the tubing that can be inserted through the irrespective openings can be readily varied so that adjustment of the bands 24 and 26 may be readily accomplished. This is desirable so that the paddle 10 of this invention can be readily adapted to fit the hand of either an adult or a child. This adjustment is readily shown in broken lines in FIGS. 3 and 4 of the drawings.

It is to be noted that the band 24 is adapted to extend around only the middle finger 18 of the person's hand. This is particularly desirable so as to provide a substantially narrow fulcrum for the hand of the swimmer which causes that person to be extremely sensitive to movements of the paddle 10. This sensitivity is readily desired so that whenever the paddle 10 assumes an inefficient position when being conducted through the water, the swimmer can make adjustments in the position of the paddle to make the movement through the water more efficient.

I claim:

1. A swim training paddle comprising:

a base composed of a rigid sheet material, said base having a fore end and an aft end, [ said aft end of said base being relieved, ] a first pair of apertures formed within said base adjacent said aft end;

a second pair of apertures formed within said base intermediate said ends but nearer said fore end than said aft end;

a first flexible tubing to be conducted through said first pair of apertures forming a loop to be located *approximately* about a swimmer's wrist; and a second flexible tubing to be conducted through said second pair of apertures forming a single loop to be located solely about the middle finger of the swimmer's hand, [ whereby the swimmer's hand is fixedly positioned upon the paddle with the pivotal movement of the hand about the wrist being substantially unhindered due to the relieving of said base, and ] whereby the most efficient position of the paddle as it moves through the water is most sensitive to the swimmer due to the narrow fulcrum about the middle finger.

2. The paddle as defined in claim 1 wherein:

said base being substantially in the shape of a rectangle.

3. The paddle as defined in claim 2 wherein:

said first flexible tubing and said second flexible tubing being formed of a soft rubber material.

4. The paddle as defined in claim 3 wherein:

said diameter of said first tubing and said second tubing being greater than the diameter of said apertures whereby the ends of said tubing must be stretched in order for such to be conducted through said apertures.

5. The paddle as defined in claim 4 wherein:

the position of said second flexible tubing being nearer the forehand portion of the swimmer's hand rather than the tip of said middle finger.

*6. The paddle as defined in claim 1 wherein:*

*said aft end of said base being relieved, whereby the swimmer's hand is fixedly positioned upon the paddle with the pivotal movement of the hand about the wrist being substantially unhindered due to the relieving of said base.*

* * * * *